(12) United States Patent
Tokishige et al.

(10) Patent No.: US 7,895,307 B2
(45) Date of Patent: Feb. 22, 2011

(54) MONITORING DEVICE, SYSTEM, METHOD, AND PROGRAM FOR MONITORING A DATA FILE AND A PROCESSING CONDITION USED TO PROCESS THE DATA FILE

(75) Inventors: Masato Tokishige, Nara (JP); Kayo Okamoto, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1282 days.

(21) Appl. No.: 11/044,678

(22) Filed: Jan. 26, 2005

(65) Prior Publication Data
US 2005/0188084 A1    Aug. 25, 2005

(30) Foreign Application Priority Data
Jan. 28, 2004    (JP) ............................ 2004-020268

(51) Int. Cl.
*G06F 15/173*    (2006.01)
(52) U.S. Cl. ..................................... 709/223
(58) Field of Classification Search ................ 709/203, 709/223
See application file for complete search history.

(56) References Cited

U.S. PATENT DOCUMENTS

| 7,145,673 | B1 * | 12/2006 | Lin ........................... 358/1.15 |
| 7,258,498 | B2 * | 8/2007 | Hatta et al. ................... 400/62 |
| 2002/0001104 | A1 * | 1/2002 | Shima ........................ 358/442 |
| 2002/0184043 | A1 * | 12/2002 | Lavorgna et al. .............. 705/1 |
| 2003/0007173 | A1 * | 1/2003 | Nishide et al. ............. 358/1.15 |
| 2003/0018789 | A1 * | 1/2003 | Ishiguro ..................... 709/228 |
| 2004/0070613 | A1 * | 4/2004 | Sprague et al. ............. 345/762 |
| 2005/0027781 | A1 * | 2/2005 | Curry et al. ................. 709/200 |
| 2005/0076084 | A1 * | 4/2005 | Loughmiller et al. ....... 709/206 |
| 2009/0242625 | A1 * | 10/2009 | Graef et al. ................. 235/379 |

FOREIGN PATENT DOCUMENTS

| JP | 2002-032201 | 1/2002 |
| JP | 2002-215341 | 8/2002 |
| JP | 2003-108325 | 4/2003 |
| JP | 2003-186655 | 7/2003 |
| JP | 2003-196053 | 7/2003 |

* cited by examiner

*Primary Examiner*—Kevin Bates
*Assistant Examiner*—Oleg Survillo
(74) *Attorney, Agent, or Firm*—Edwards Angell Palmer & Dodge LLP; David G. Conlin; David A. Tucker (57) ABSTRACT

A monitoring device includes: a setting storing section for storing beforehand a correspondence between identification information for identifying a data file, and a processing condition of the data file having the identification information; an extracting section for acquiring, as transmitted identification information, identification information of the data file transmitted to the information processing apparatus, and, as a transmitted processing condition, the processing condition of the data file transmitted to the information processing apparatus; a comparing section for determining whether a combination of the transmitted identification information and the transmitted processing condition matches the correspondence between the identification information and the processing condition stored in the setting storing section; and a notifying section for notifying a sender of the data file that there is no match, if so determined by the comparing section.

11 Claims, 7 Drawing Sheets

| DATA FILE NAME | | SETTING GROUP | | | | | FILE CREATOR | COMMENTS (NOTES) |
|---|---|---|---|---|---|---|---|---|
| SHARED FILE NAME OR TEMPLATE NAME | APPLICATION NAME | ... | NUMBER OF COPIES | PAGE | ... | SIDE | ... | CONTACT ADDRESS | |
| ......... | ......... | ... | ... | ... | ... | ... | ... | | |
| FORM A | SPREADSHEET | ... | 1 | 2 | ... | DOUBLE-SIDED | ... | Suzuki | MAKE DOUBLE-SIDED COPIES BY DESIGNATING MULTIPLE WORKSHEETS |
| ......... | ......... | ... | ... | ... | ... | ... | ... | | |
| COVER (CONFIDENTIAL) | (WORDPROCESSOR) | ... | 1 | 15 | ... | SINGLE-SIDED | ... | Takahashi | USE VARIABLE PRINTING |
| ......... | ......... | ... | ... | ... | ... | ... | ... | | |

| SETTING HISTORY | | SETTING GROUP | | | | USER | DATA FILE NAME |
|---|---|---|---|---|---|---|---|
| COVER (CONFIDENTIAL) | WORDPROCESSOR | ... | 11 | 1 | ... | SINGLE-SIDED | ... | ZZZ | ××COVER (CONFIDENTIAL) |
| ......... | ............ | ... | ... | ... | ... | ... | ... | ... |
| COVER (CONFIDENTIAL) | WORDPROCESSOR | ... | 1 | 8 | ... | SINGLE-SIDED | ... | YYY | △△COVER (CONFIDENTIAL) |
| ......... | ............ | ... | ... | ... | ... | ... | ... | ... |
| COVER (CONFIDENTIAL) | WORDPROCESSOR | ... | 1 | 15 | ... | SINGLE-SIDED | ... | XXX | ○○COVER (CONFIDENTIAL) |
| ......... | ............ | ... | ... | ... | ... | ... | ... | ... |

MONITORING DEVICE, SYSTEM, METHOD, AND PROGRAM FOR MONITORING A DATA FILE AND A PROCESSING CONDITION USED TO PROCESS THE DATA FILE

This Nonprovisional application claims priority under 35 U.S.C. §119(a) on patent application No. 020268/2004 filed in Japan on Jan. 28, 2004, the entire contents of which are hereby incorporated by reference.

FIELD OF THE INVENTION

The present invention relates to a monitoring device for monitoring identification information and processing conditions of a data file transmitted to an information processing apparatus such as a printer. More specifically, the present invention relates to a monitoring device for notifying that a combination of identification information and a processing condition of the data file is inappropriate if it is determined so, an image forming apparatus including the monitoring device, a monitoring system, a monitoring program, and a storage medium.

BACKGROUND OF THE INVENTION

Recently, there have been proposed image processing devices that can be shared by a plurality of operators via a network. A specific example of such image processing devices is a network printer connected to a plurality of personal computers via a network.

In some network printers, a transmitted or received print job is saved and managed for improved efficiency (see Patent Publications 1 and 2, for example).

More specifically, Patent Publications 1 and 2 disclose a structure in which a print request is saved, and the saved data is processed upon a print request being sent to the printer.

[Patent Publication 1]
Japanese Laid-Open Patent Publication No. 186655/2003 (Tokukai 2003-186655; published on Jul. 4, 2003)

Japanese Laid-Open Patent Publication No. 215341/2002 (Tokukai 2002-215341; published on Aug. 2, 2002)

However, the conventional structure suffers from the following drawback. For example, in the case where a data file needs to be processed by the same processing condition among a plurality of operators, each operator needs to give the same processing condition. However, this is not always possible since an operator who does not know the processing condition may enter a different processing condition.

For example, when a data file created by a spreadsheet requires double-sided printing for two sheets, there are cases where an operator, not knowing the processing condition, outputs the two sheets on separate sheets of paper.

That is, while the conventional structure allows the information processing apparatus to store the transmitted job or manage the status of the job, it cannot decide whether or not a proper processing method is employed.

SUMMARY OF THE INVENTION

An object of the present invention is to provide a monitoring device that determines the appropriateness of a transmitted processing condition of a data file to be processed by a predetermined processing method, and that sends out a notice when the processing condition is inappropriate. The invention also provides an image forming apparatus and monitoring system including such a monitoring device, and a monitoring program and a storage medium.

In order to achieve the foregoing objects, the present invention provides a monitoring device (setting monitoring sections 30, 52) for monitoring a data file, and a processing condition used to process the data file in an information processing apparatus, upon the data file and the processing condition being transmitted to the information processing apparatus, the monitoring device (setting monitoring sections 30, 52) including: a storing device (setting storing section 44) for storing beforehand a correspondence between identification information for identifying a data file, and a processing condition for the identification information; an acquiring section (extracting section 41) for acquiring, as transmitted identification information, identification information of the data file transmitted to the information processing apparatus, and, as a transmitted processing condition, the processing condition of the data file transmitted to the information processing apparatus; a determining section (comparing section 42) for determining whether a combination of the transmitted identification information and the transmitted processing condition matches the correspondence between the identification information and the processing condition stored in the storing device (setting storage section 44); and a notifying section (notifying section 43) for notifying a sender of the data file that there is no match, if so determined by the determining section (comparing section 42).

Also, in the monitoring device (setting monitoring sections 30, 52) according to the present invention, it is preferable that the determining means (comparing section 42) include: searching means (file name comparing section 46) for searching the storing means to find therein a correspondence that contains identification information similar to the transmitted identification information; and condition determining means (processing condition comparing section 45) for determining whether the transmitted processing condition matches a processing condition contained in the correspondence found by the searching means.

With this configuration, based on the transmitted identification information, a search is made through the storing means to find therein an appropriate correspondence, and whether or not the transmitted processing condition matches a processing condition contained in the correspondence is determined. More specifically, the appropriateness of the processing condition assigned to the data file to be processed by a predetermined processing condition is determined, and, if inappropriate, a notice is sent to a sender of the data file. Note that, as used herein, the term "similar" includes "a perfect match." That is, the term "similar" is used where there is a perfect match or a partial match (similar as a whole). In other words, the terms "similar" is used where there is at least a partial match. Note that, even when there is no partial match or complete match, the term "similar" can be used if there is a pre-set correspondence between the transmitted identification information and the stored identification information stored in the storing means.

In addition, it is preferable that the monitoring device (setting monitoring section 30, 52) further includes: history storing means (history storing section 48) for storing a combination of the transmitted identification information and the transmitted processing conditions; and correspondence creating means (correspondence creating section 47) for creating, based on the combination stored in the history storing means (history storing section 48), a correspondence between identification information and a processing condition, and storing the correspondence in the storing means (setting storing section 44).

With this configuration, the correspondence is established from the accumulated combinations of transmitted identification information and transmitted processing conditions of the past data files transmitted to the information processing apparatus. As such, an operator does not need to create the correspondence beforehand.

Furthermore, a monitoring system (monitoring system 1) according to the present invention includes: the monitoring device (setting monitoring sections 30, 52); an information processing apparatus (printer 3) for processing received data file; and a data transmitting apparatus (personal computer 2) for transmitting a data file to the information processing apparatus.

With this configuration, the monitoring device (setting monitoring sections 30, 52) can determine the appropriateness of the combination of a transmitted data file and transmitted processing condition. The data transmitting apparatus is used to convert a shared file into a data file, for example.

In the monitoring system according to the present invention, it is still further preferable that the information processing apparatus include transmitting means (setting transmitting section 24) for transmitting a combination of the transmitted identification information and the transmitted processing condition to the monitoring device.

With this configuration, since the information processing apparatus is provided with the transmitting means for transmitting the combination to the information processing apparatus, the information processing apparatus can transmit the combination to the monitoring device (setting monitoring sections 30, 52). This allows for monitoring without providing the monitoring device between the information processing apparatus and the data transmitting apparatus.

Further, in order to achieve the foregoing objects, the present invention provides a monitoring system including: the monitoring device (setting monitoring sections 30, 52); an information processing apparatus (printer 3) for processing received data file; and a data transmitting apparatus for transmitting a data file to the information processing apparatus.

With this configuration, the monitoring device can determine the appropriateness of the combination of a transmitted data file and a transmitted processing condition.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention.

A monitoring system according to the present embodiment determines whether transmitted processing conditions of data files of which a processing manner has been determined beforehand are appropriate, and notifies that they are inappropriate if it is determined so. Note that, in the following descriptions, a personal computer is adopted as a data transmitting apparatus, and a printer, one example of image forming apparatuses, is adopted as an information processing apparatus.

Figure 2:
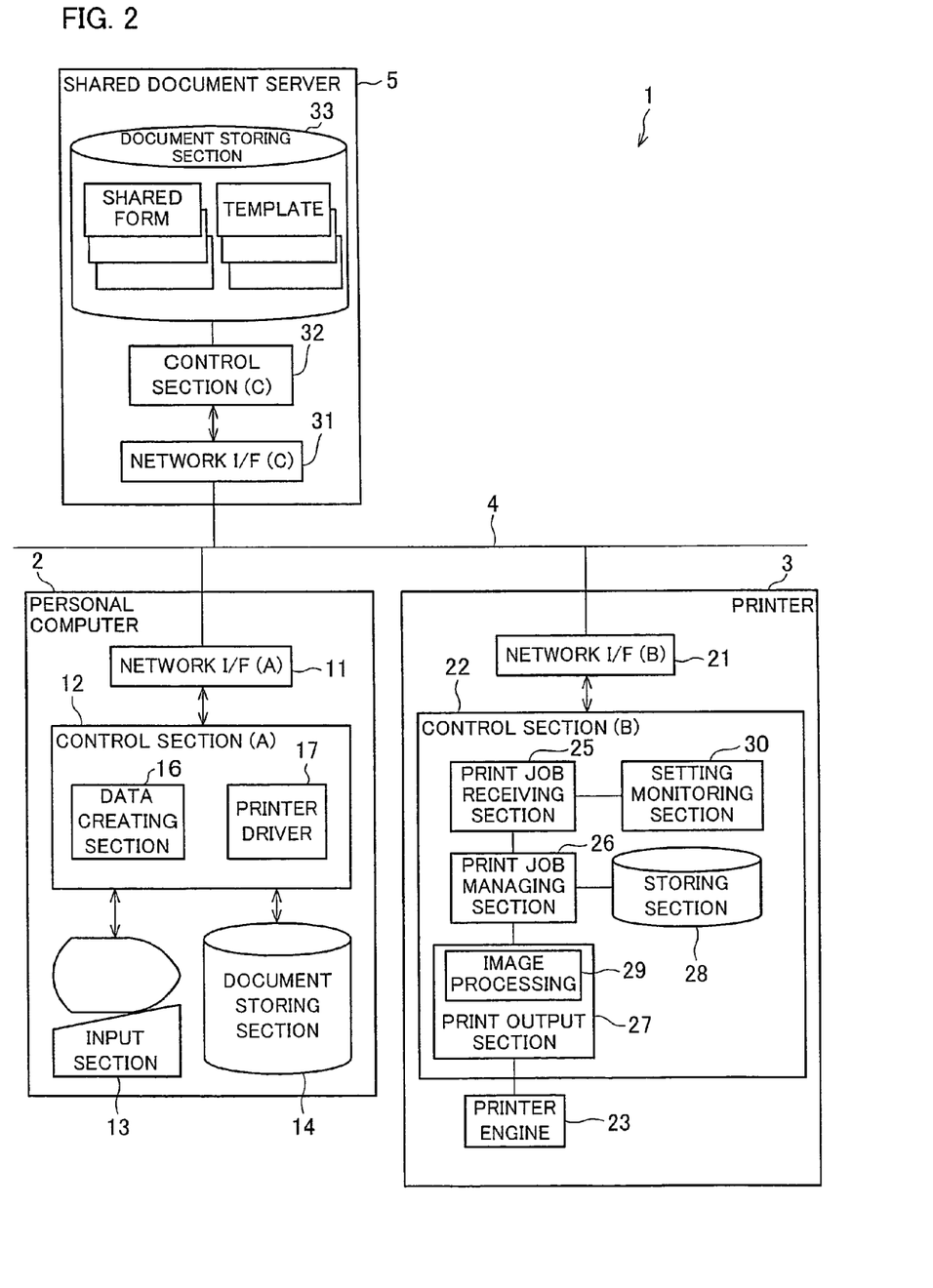
FIG. 2 is a block diagram schematically illustrating a structure of a monitoring system according to one embodiment of the present invention.

FIG. 2 is a block diagram schematically illustrating a configuration of a monitoring system 1 according to the present embodiment. The monitoring system 1 is provided with a personal computer 2 (data transmitting apparatus) and a printer 3 (information processing apparatus). Further, if necessary, a shared document server 5 may be provided therein. Note that, the following will describe an arrangement in which the shared document server 5, the personal computer 2, and the printer 3 are connected to one another via a network 4.

The personal computer 2 transmits a data file to the printer 3. The personal computer 2 may transmit, for example, an externally obtained data file, to the printer 3, or may transmit a data file created in the personal computer 2. Moreover, at the time of transmitting the data file to the printer 3, the personal computer 2 also transmits processing conditions (e.g. number of copies to be printed, and whether or not double-sided printing should be carried out) used to process the data file in the printer 3. In other words, the personal computer 2 transmits, to the printer 3, both a data file and its processing condition used to process the data file. Note that, a setting of the processing condition can be changed appropriately. That is, the processing conditions are changed depending upon types and contents of data files.

The personal computer 2 is provided with a network I/F (A)11, a control section (A)12, an input section 13, and a document storing section 14.

The network I/F (A)11 actually transmits and receives information to and from devices connected to the personal computer 2 via the network 4. That is, the network I/F (A)11 has a communications circuit (not shown).

The input section 13 is realized by, for example, a keyboard, mouse, and/or ten-key numerical pad, and is used to enter information to the personal computer 2. Further, through the input section 13, processing conditions of data files can be entered.

The document storing section 14 stores therein documents (data files) created by using application software and the like. Note that, the document storing section 14 may store therein not only the aforesaid documents but also various sets of application software and an OS (Operating System), for example.

The control section (A)12 controls the network I/F(A) 11, the input section 13, and the document storing section 14. Moreover, the control section (A) 12 is provided with a data creating section 16 and a printer driver 17.

The data creating section 16 creates an application data file to be outputted from the printer 3. Then, the printer driver 17 converts the application data file into a data file having a form suitable for processing in the printer 3, and creates a processing condition used to process the data file. Subsequently, the printer driver 17 transmits the created data file and the processing condition via the network I/F (A) 11 to the printer 3.

Here, the printer 3 is described. The printer 3 is provided with a network I/F (B)21, a control section (B)22, and a printer engine 23.

The network I/F (B)21 transmits and receives information to and from devices connected to the printer 3 via the network 4. That is, the network I/F (B)21 has a communications circuit (not shown).

The printer engine 23, which is an image forming section in the printer 3, performs image formations in accordance with data transmitted from the printer driver 17. Note that, a specific arrangement of the image forming section is well known, so that detailed descriptions thereof are omitted here.

The control section (B)22 controls the network I/F (B)21 and the printer engine 23. More specifically, the control section (B)22 is provided with a print job receiving section 25, a print job managing section 26, a print output section 27, a storing section 28, and a setting monitoring section 30 (monitoring device). The setting monitoring section 30 will be described in detail later.

The print job receiving section 25 extracts, from data supplied via the network I/F (B) 21, only a data file and a processing condition of the data file, and then transmits them to the print job managing section 26.

The print job managing section 26 manages the data file and processing condition of the data file transmitted from the print job receiving section 25. More specifically, the print job managing section 26 causes the storing section 28 to store the data file and processing condition therein, and suitably outputs the data file and processing condition to the print output section 27.

The storing section 28 temporarily stores therein the data file and processing condition. Moreover, the storing section 28 stores various kinds of settings for operating the printer 3.

In accordance with the foregoing processing condition, the print output section 27 converts the data file into print data suitable for processing of the data file in the printer engine 23. More specifically, the print output section 27 is provided with a print processing section 29 that converts the data file into print data. Further, the print output section 27 transmits not only the print data but also a control signal for operating the printer engine 23, to the printer engine 23.

Next, the shared document server 5 is now described. The shared document server 5 is one for holding templates, shared forms, shared files, and others used by a plurality of operators to create data in common forms. The shared document server 5 is provided with a network I/F (C)31, a control section (C)32, and a document storing section 33.

The network I/F (C)31 transmits and receives information to and from devices connected to the shared document server 5 via the network 4. The document storing section 33 stores therein templates, shared forms, shared files, and others. The control section (C)32 controls the document storing section 33 and the network I/F (C)31.

The template is a pre-designed data file and is used, for example, in a case when a data file is created in a form common among a plurality of operators. The shared form and shared file are data files that can be shared among a plurality of operators.

Here, the data file is described. The data file is processed by the printer 3 (information processing apparatus). In the present embodiment, the data file refers to data files which have been converted into a printable by the printer driver 17 included in the personal computer 2, in order to be transmitted to the printer 3. Note that, the data file may contain a processing condition used to process the data file in the printer 3. That is, in the present embodiment, the data file and processing condition may be transmitted together or separately to the printer 3. Further, the processing condition is used to process the data file in the printer 3. The printer driver 17 creates a processing condition in accordance with operator input. At the time of making a print request to the printer driver 17, the data creating section 16 transmits, to the printer driver 17, an application data file together with information such as an application data file name, extension, and template name. The printer driver 17, at the time of converting the received application data file into the data file, adds thereto identification information such as a name of the application (application data file name), extension, and template name. Note that, the printer driver 17 may newly create the data file name or may adopt the name of the application data as the data file name.

Further, the foregoing data file is transmitted from the personal computer 2 to the printer 3. In other words, for example, in a case where data created by using some kind of application is directly transmitted to the printer 3, the aforesaid data corresponds to the data file. Further, in a case where data transmitted to the printer 3 is converted data obtained by the printer driver 17 or other converters by converting data created by using some kind of application, this converted data corresponds to the data file.

Still further, the data file contains identification information for identifying the data file. More specifically, the foregoing data file contains identification information such as the data file name and extension. That is, the identification information may be one indicating the type of data file or may be such a data file name that identifies the data file itself. Note that, the extension is identification information indicating that the data file has been created by using a particular application.

Further, if the application data file has been created using, for example, a template (pre-designed data file), the printer driver 17 may add information about the template to identification information of the data file.

In the present embodiment, the setting monitoring section (monitoring device) 30 is provided to monitor, during the processing of a data file in the printer 3, whether the data file is being processed under appropriate processing conditions. In the present embodiment, the setting monitoring section 30 is provided in the printer 3. The following will describe the setting monitoring section 30 in detail.

Figure 1:
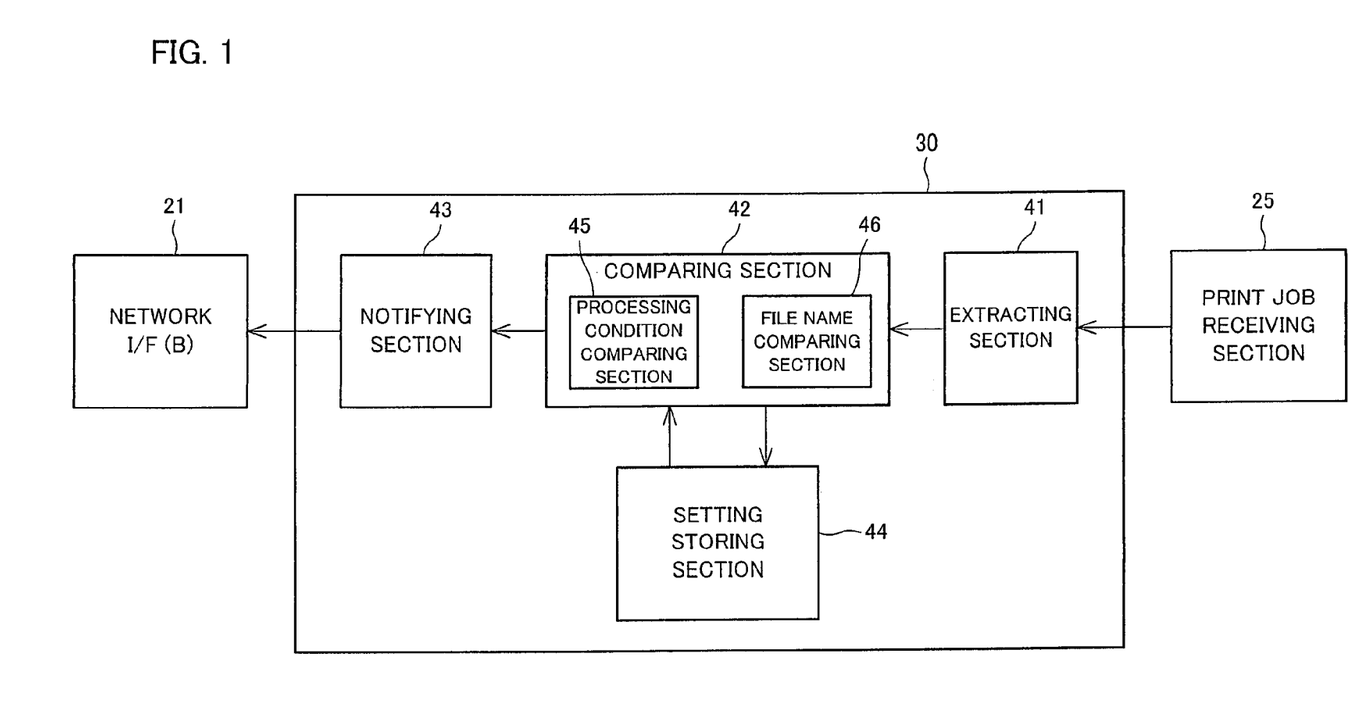
FIG. 1 is a block diagram schematically illustrating a structure of a monitoring device according to one embodiment of the present invention.

The setting monitoring section 30, as illustrated in FIG. 1, is provided with an extracting section 41, a comparing section 42, a setting storing section 44, and a notifying section 43. The setting monitoring section 30 is provided in the control section (B)22 of the printer 3.

The extracting section 41 acquires, from a data file and processing condition of the data file which have been transmitted to the print job receiving section 25 via the network I/F (B)21, a combination of identification information and the processing condition of the data file. That is, the extracting section 41 does not need to acquire the data file itself, and it is safe provided that the extracting section 41 acquires at least the identification information contained in the data file. In the present embodiment, the extracting section 41 acquires a data file name as the identification information of the data file. That is, in the present embodiment, the extracting section 41 is arranged so as to acquire a combination of the data file name and processing condition. Note that, as used herein, the identification information acquired by the extracting section 41 will be called "transmitted identification information," and the processing condition acquired by the extracting section 41 will be called "transmitted processing condition."

The setting storing section 44 stores therein a correspondence between identification information (herein, data file name) of a particular data file and a processing condition of the particular data file.

The comparing section 42 determines whether a combination of the transmitted identification information and the transmitted processing condition of the data file, which have been acquired by the extracting section 41, matches the correspondence stored in the setting storing section 44. More specifically, the comparing section 42 is provided with a file name comparing section 46 and a processing condition comparing section 45.

The file name comparing section 46 determines whether a data file name (transmitted identification information) contained in the combination of the transmitted identification information and the transmitted processing condition, which have been acquired by the extracting section 41, matches the identification information of the particular data file stored in the setting storing section 44. Further, the processing condition comparing section 45 determines whether the processing condition contained in the foregoing combination, which has been acquired by the extracting section 41, matches the processing conditions stored in the setting storing section 44.

The notifying section 43 notifies, to a sender of the data file, that the transmitted combination of the data file name and processing condition does not match the correspondence stored in the setting storing section 44, if the comparing section 42 determines so.

In the present embodiment, the file name comparing section 46 determines whether the externally supplied data file name matches the data file name (identification information) contained in the correspondence, which is stored in the setting storing section 44. Note that, as used herein, the term "match" means, for example, a perfect match, or a match found by prefix search or suffix search.

Next, the processing condition comparing section 45 determines whether the processing condition of the externally supplied data file match the processing condition of the "matched" correspondence as determined by the file name comparing section 46.

That is, in the present embodiment, the correspondence stored in the setting storing section 44 is searched based on the externally supplied data file name, and then if it is determined that there is a corresponding name in the correspondence, it is determined whether processing condition contained in the searched correspondence match processing condition of the data file.

Figure 3:
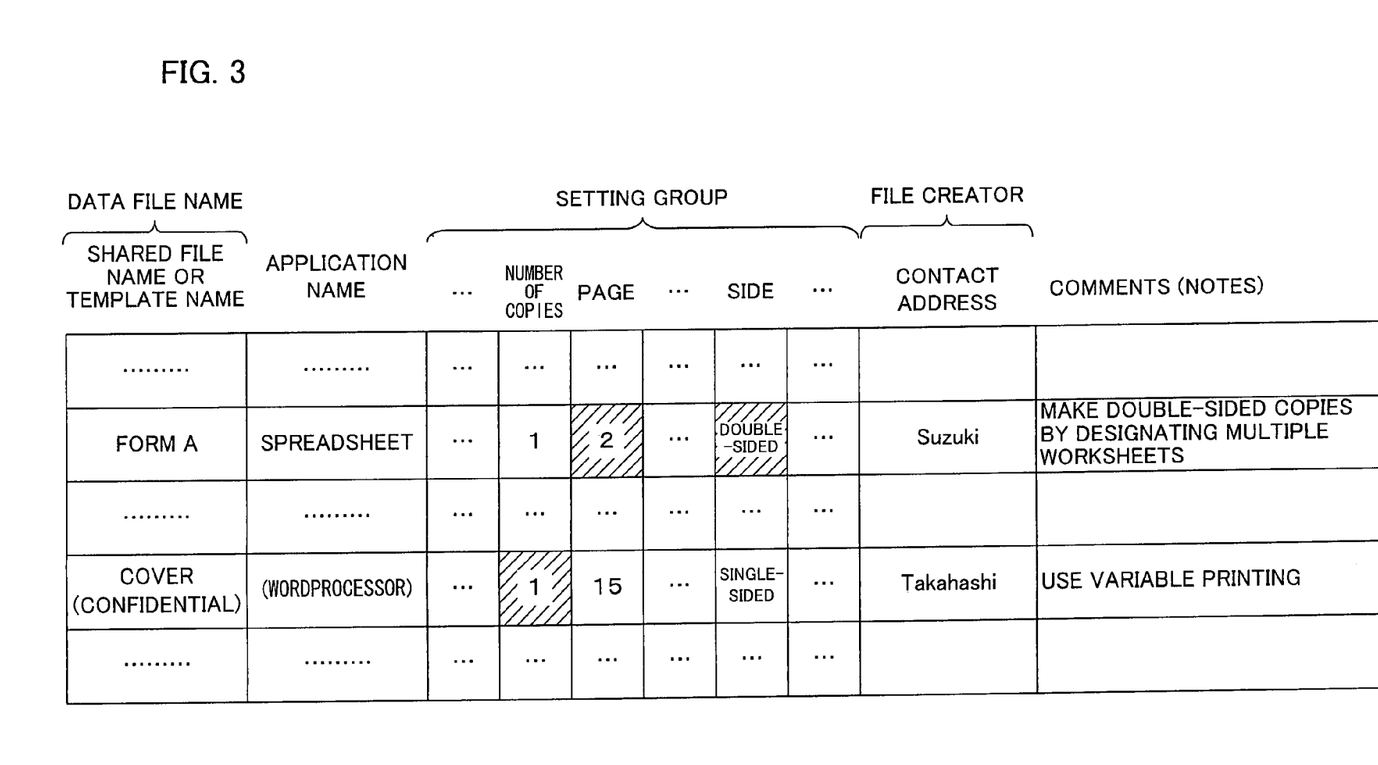
FIG. 3 is a table representing correspondence between data file names and processing conditions.

Here, referring to FIG. 3, the following will describe the correspondence between a data file name and a processing condition, which is stored in the setting storing section 44. FIG. 3 illustrates a table representing correspondences between data file names and processing conditions.

The setting storing section 44, as illustrated in FIG. 3, stores a table containing a data file name, an application name by which a data file is created, a setting group (processing condition), a file creator, and comments. Note that, items to be stored in the table are not limited to the foregoing items, and any items can be stored in the table provided that data file names and processing conditions are stored in the table. Note that, the hatched areas in FIG. 3 indicate processing conditions. In other words, as used herein, the "processing condition" does not mean a whole set of conditions used to process the data file. Rather, it only means at least a particular condition among a plurality of conditions.

Figure 4:
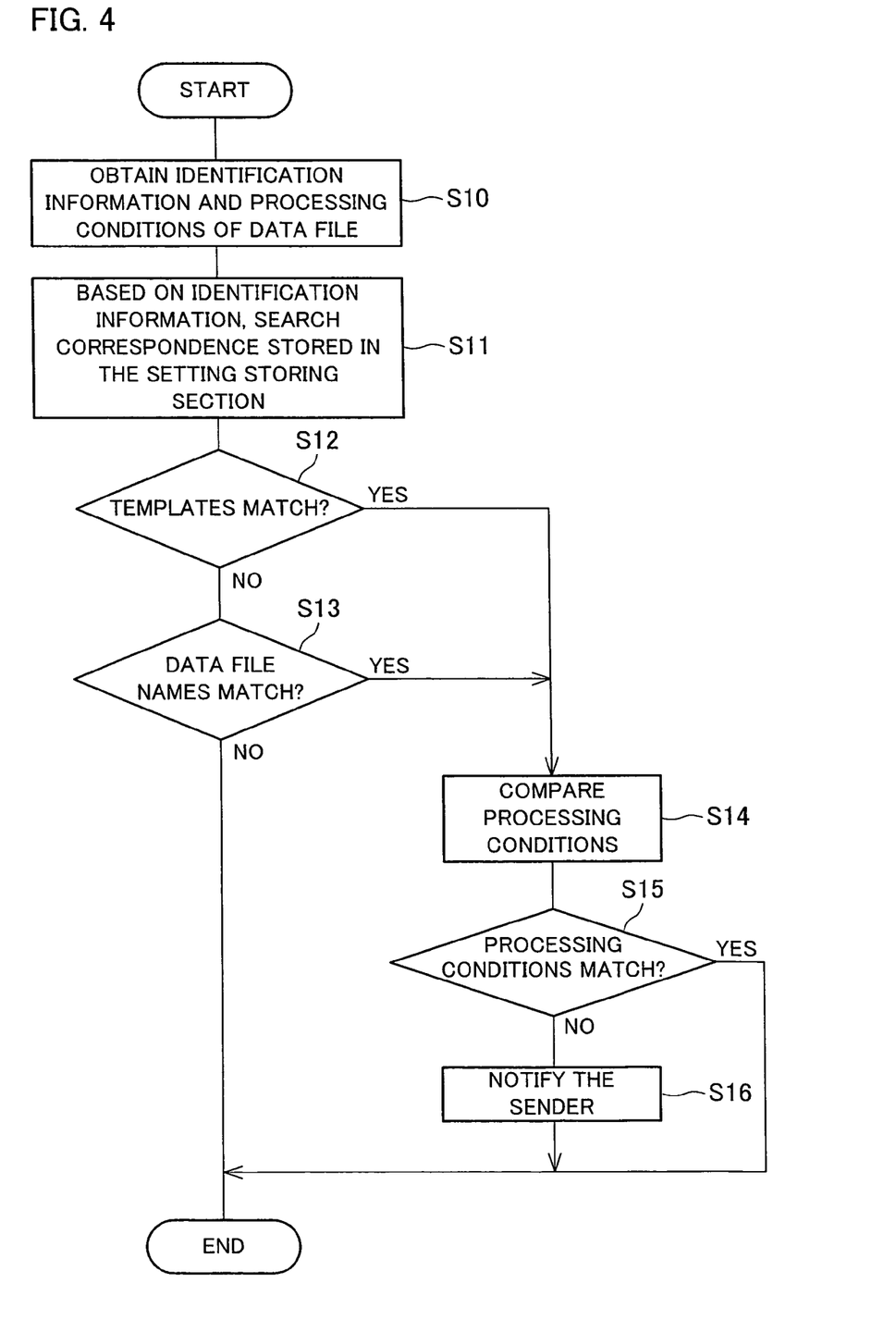
FIG. 4 is a flowchart explaining a monitoring process employing a monitoring method according to one embodiment of the present invention.

Referring to a flowchart in FIG. 4, the following will describe how various kinds of processes are carried out in accordance with the result of the determination whether a combination of the externally supplied data file name and processing condition matches the correspondence stored in the setting storing section 44. FIG. 4 is a flowchart illustrating a flow of a monitoring process using a monitoring method according to the present embodiment. Note that, in the following descriptions, a data file sent to the monitoring device is created by using a particular template. In addition, in the following descriptions, the setting storing section 44 stores therein data file names, template names, processing conditions, and comments. The template name and data file name are both identification information.

The extracting section 41 acquires, from a data file transmitted to the print job receiving section 25 of the printer 3, a combination of identification information and processing condition of the data file (S10).

Next, based on the transmitted identification information of the combination which has been acquired by the extracting section 41, the comparing section 42 searches the setting storing section 44 to find therein a correspondence that corresponds to the transmitted identification information (S11).

More specifically, the file name comparing section 46 of the comparing section 42 determines whether a template name of the data file contained in the foregoing combination matches a template name of the data file stored in the setting storing section 44 (S12).

In Step S12, if it is determined that there is no match, the file name comparing section 46 searches data file names stored in the setting storing section 44 to determine whether there is a name similar to the data file name contained in the foregoing combination (S13). Here, the "determination whether there is a name similar to the data file name" means determination whether there is a perfect match or a match found by prefix search or suffix search.

Then, in Step S13, if it is determined that the setting storing section 44 does not contain a data file name similar to the data file name contained in the foregoing combination, the comparing section 42 determines that the foregoing combination meets the correspondence stored in the setting storing section 44, and stops the process. In other words, if it is determined that the data file name acquired by the extracting section 41 is not contained in the data file names listed in the table containing the correspondences stored in the setting storing section 44, the comparing section 42 determines that the combination of the data file name and processing condition, acquired by the extracting section 41, matches the correspondence stored in the setting storing section 44. Note that, in order to determine whether there is a match with the correspondence, the comparing section 42 may use, for example, a table that tells that all the files not corresponding to a particular data file name meet the correspondence. Alternatively, the comparing section 42 may use, for example, a program that tells that all the names not contained in the data file names stored in the table meet the correspondence. In other words, in the present embodiment, if one of the data file name and the processing condition in the combination matches and the other does not match, the comparing section 42 determines that "there is no match". Otherwise (if both and neither the data file name and processing condition match), the comparing section 42 determines that "there is a match".

On the other hand, if it is determined in Step S12 that there is a match in template name between the transmitted data file and the data file stored in the setting storing section 44, or if it is determined in Step S13 that there is a match in data file name between the two data files, the processing condition comparing section 45 of the comparing section 42 compares the processing conditions of the two data files (S14).

Then, as to the two data files, i.e. the data file stored in the setting storing section 44 and the obtained data file, which match each other in data file name or template name, the processing condition comparing section 45 determines whether the processing conditions of the two data files match each other (S15).

In Step S15, if the processing condition comparing section 45 determines that the processing conditions of the two data files match each other, it determines that the combination of the data file name and processing condition, obtained by the extracting section 41, meets the correspondence stored in the setting storing section 44, and then stops the process.

On the other hand, in Step S15, if the processing condition comparing section 45 determines that the processing conditions of the two data files do not match each other, the comparing section 42 instructs the notifying section 43 to send a notification to the sender as such. Then, the notifying section 43 sends a notification to the sender of the foregoing data file (S16). More specifically, the notifying section 43 notifies the sender of a difference in processing conditions between the two data files. In addition, the notifying section 43 sends other information as well, including, for example, comments stored in the setting storing section 44 and made on the "matched" correspondence determined in Step S13 or S14.

As described above, the setting monitoring section 30 (monitoring device) according to the present embodiment monitors a data file, and a processing condition used to process the data file in the printer 3, upon the data file and the processing condition being transmitted to the printer 3, the setting monitoring section 30 including: the setting storing section 44 for storing beforehand a correspondence between identification information for identifying a data file and a processing condition of the data file having the identification information; the extracting section 41 for acquiring, as transmitted identification information, identification information of the data file transmitted to the printer 3, and, as a transmitted processing condition, the processing condition of the data file transmitted to the printer 3; the comparing section 42 for determining whether a combination of the transmitted identification information and the transmitted processing condition matches the correspondence between the identification information and the processing condition stored in the setting storing section 44; and the notifying section 43 for notifying a sender of the data file that there is no match, if so determined by the comparing section 42.

With this configuration, if the combination of the data file and processing condition, which has been transmitted from the personal computer 2 to the printer 3, does not match a particular correspondence, it is notified as such. Therefore, the operator will know that the data file inappropriately corresponds to the processing condition.

Further, the notifying section 43 may be adapted so that, if the comparing section 42 determined that "there is no match", the sender is notified as such, and that the processing of the printer 3 is stopped. This can prevent a wrong output.

Note that, in the above descriptions, a one-to-one correspondence is established between the data file name and the processing condition to be carried out for the data file name. However, the present invention is not limited to the one-to-one correspondence and may establish one-to-more-than-one correspondence. For example, a correspondence between certain identification information and a particular range of processing condition may be established, for example, such that if the data file name contains a character string "confidential", the number of copies to be printed should be within the range from 1 to 10.

Further, in the above descriptions, a data file name is used as identification information. However, the identification information is not limited to the data file name, and for example, may be an extension of a file.

Still further, in the above descriptions, determination whether a combination of a data file name and processing condition, acquired by the extracting section 41, matches a correspondence stored in the setting storing section 44 is carried out by comparing data file names, and then comparing corresponding processing conditions. However, the comparison method is not limited to this example, as described below.

For example, assume that a data file name is a particular variable A, and processing condition is a particular variable B. The setting storing section 44 stores the product of the variable A and variable B. For example, it may be determined whether the product of variable A and variable B for a data file and processing condition externally supplied to the printer 3 matches the product of variable A and variable B stored in the setting storing section 44. In this manner, the determination may be carried out using transmitted two variables (data file name and processing condition).

Further, in the above descriptions, the setting storing section 44 stores data file names, processing conditions, and comments. For example, there are cases where the data file is a shared file and the setting storing section 44 stores a creator of the file. In this case, if it is determined that there is no match in processing conditions between the supplied data file and its corresponding data file, the creator of the shared file may be presented. This makes it possible to directly contact the creator of the shared file, thereby enabling a proper processing condition to be set. In other words, if the comparing section 42 determines that a combination of transmitted identification information and transmitted processing condition does not match a correspondence stored in the setting storing section 44, the notifying section 43 may notify the sender of, for example, contact information of the shared file's creator etc., and notes such as comments.

Still further, in the above descriptions, the printer 3 is provided with separate storing sections, i.e. the setting storing section 44 of the setting monitoring section 30, and the storing section (B)28. However, these storing sections may be provided in one storage device.

The foregoing embodiment has been described based on an example where the members constituting the monitoring device are "the functional blocks realized by computing means, such as a CPU, executing a program code contained in a ROM, RAM, or other storage medium". Alternatively, the function blocks may be realized by hardware carrying out the same processes. A further alternative is a combination of hardware carrying out some of the processes, and computing means controlling the hardware and executing a program code for the remaining processes. Further, the members which were described as hardware may be realized by a combination of hardware carrying out some of the processes, and computing means controlling the hardware and executing a program code for the remaining processes. The computing means may be a single entity, or a set of computing means, connected over an internal device bus and various communications paths, working together to execute a program code.

The program executed by the computing means is a program code itself directly executable by the computing means, or a program as data that can generate a program code by decompression or other processes (detailed later). For the execution, the program (program code or the data) is stored and distributed on a storage medium, or the program is transmitted and distributed over communications means which transmits the program over wired or wireless communications paths.

To transmit over a communications path, the program is transmitted though a communications path by means of a series of signals indicative of programs which propagate through the transmission media constituting the communications path. To transmit a series of signals, a transmitter device may modulate a carrier wave with the series of signals indicative of the programs to transmit the series of signals on the carrier wave. In this case, a receiver device will restore the series of signals by demodulating the carrier wave. Meanwhile, when transmitting the series of signals, the transmitter device may divide the series of signals as a series of digital data into packets for a transmission. In this case, the receiver device will combine received group of packets to restore the series of signals. In addition, the transmitter device may transmit the series of signals by time division, frequency division, code division, or other multiplex schemes involving the series of signals and other series of signals. When this is the case, the receiver device will extract individual series of signals from a multiplex series of signals to restore them. In any case, similar effects are obtained if the program can be transmitted over a communications path.

Here, the storage medium for the distribution of a program is preferably removable. After the distribution of the program, the storage medium may or may not be removable. In addition, the storage medium may or may not be rewriteable (writeable) or volatile, or may be recorded by any method or provided in any shape, provided that the medium can store the program. Examples of such a storage medium include tapes, such as magnetic tapes and cassette tapes; magnetic disks, such as floppy (registered trademark) disks and hard disks; and other disks, such as CD-ROMs, magneto-optical discs (MOs), mini discs (MDs), and digital video discs (DVDs). In addition, the storage medium may be a card, such as an IC card or an optical card; a semiconductor memory, such as a mask ROM, an EPROM, an EEPROM, or a flash ROM; or a memory provided inside a CPU or other computing means.

The program code may be such that it instructs the computing means regarding all the procedures of the processes. If there is already a basic computer program (for example, an operating system or library) which can be retrieved by a predetermined procedure to execute all or some of the processes, a code or a pointer which instructs the computing means to retrieve the basic computer program can replace all or some of the processes.

In addition, the program storage format of the storage medium may be, for example, such that: the computing means can access the program for an execution as in an actual memory having loaded the program; the program is not loaded into an actual memory, but installed in a local storage medium (for example, an actual memory or hard disk) always accessible to the computing means; or the program is stored before installing in a local storage medium from the network 4 or a mobile storage medium. In addition, the program is not limited to a compiled object code. The program may be stored as a source code or intermediate code generated in the course of interpretation or compilation. In any case, similar effects are obtained regardless of the format in which the storage medium stores the program, provided that decompression of compressed information, decoding of encoded information, interpretation, compilation, links, or loading to a memory or combinations of these processes can convert into a format executable by the computing means.

Second Embodiment

The following will describe another embodiment of the present invention. Note that, for convenience of explanation, members having the same functions as those described in the First Embodiment are given the same reference numerals and explanations thereof are omitted here.

Figure 5:
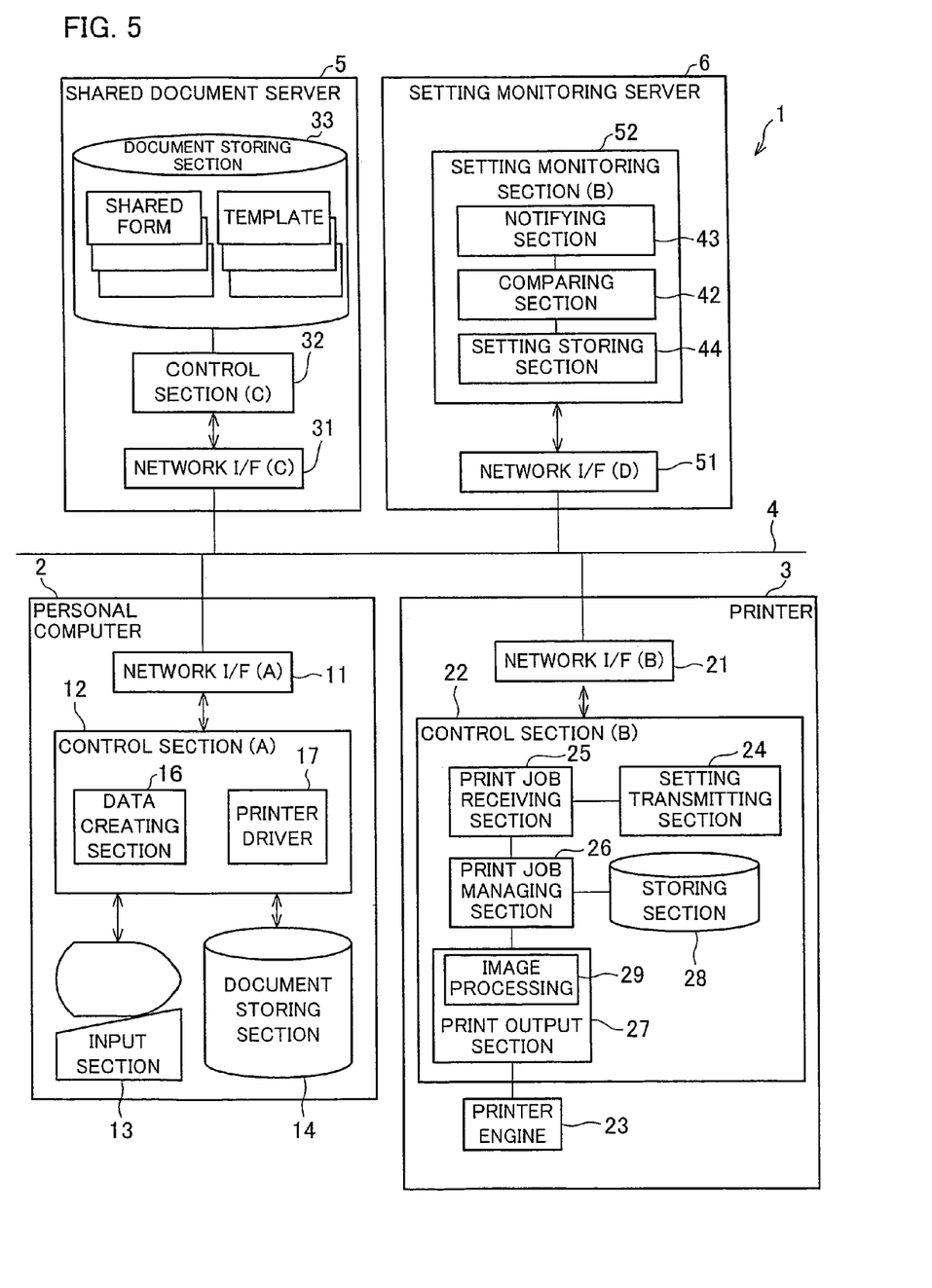
FIG. 5 is a block diagram illustrating another structure of a monitoring system according to one embodiment of the present invention.

In a monitoring system 1 of the present embodiment, the monitoring device for monitoring the data file and processing condition transmitted to the printer 3 from the personal computer is provided independent from the personal computer 2 or the printer 3.

FIG. 5 is a block diagram illustrating another configuration of the monitoring system 1 according to the present embodiment. As shown in FIG. 5, the monitoring system 1 includes a monitoring device independently from the personal computer 2 or the printer 3. Specifically, the monitoring system 1 according to the present embodiment includes a shared document server 5, a personal computer 2, a printer 3, and a setting monitoring server (monitoring device) 6.

The printer 3 includes a control section (B)22 in which a setting transmitting section 24 is provided. The setting transmitting section 24 extracts a combination of transmitted identification information and transmitted processing condition of a data file from among the data files and processing conditions externally supplied to a print job receiving section 25. The information so extracted is transmitted to the setting monitoring server 6 by the setting transmitting section 24.

The setting monitoring server 6 includes a network I/F (D)51 and a setting monitoring section (B)52. The network I/F(D)51 is provided to send and receive information to and from various devices connected via the network 4 to the setting monitoring server 6.

The setting monitoring section (B)52 includes a comparing section 42, a setting storing section 44, and a notifying section 43. The comparing section 42 determines whether a combination of a data file name (transmitted identification information) and transmitted processing condition transmitted via the network I/F(D)51 from the setting transmitting section 24 matches the correspondence stored in the setting storing section 44. Specifically, the comparing section 42 includes a file name comparing section 46 and a processing condition comparing section 45.

Based on this configuration, the following will describe how the data file and processing condition transmitted from the personal computer 2 to the printer 3 are used to determine the appropriateness of the process for the data file.

First, the data creating section 16 of the personal computer 2 sends an application data file, and the name or extension, etc. of the application data file to the printer driver 17. In the printer driver 17, the application data file and its name or extension, etc. are converted into a data file. Further, based on instructions entered by an operator, the printer driver 17 creates a processing condition for processing the data file. In other words, the printer driver 17 creates a processing condition based on information entered by an operator. The data file contains identification information including, for example, the data file name, the name of an application used to create an application data file from which the data file was created, and the name of a template when the application file was created using a template.

The data file and processing condition created in the printer driver 17 are transmitted to the printer 3 via the network 4.

The transmitted data file and processing condition are received by the print job receiving section 25. Based on the data file and processing conditions received by the print job receiving section 25, the setting transmitting section 24 sends a combination of transmitted identification information and transmitted processing condition of the data file to the setting monitoring server 6.

The combination sent from the setting transmitting section 24 via the network I/F (D)51 is received by the comparing section 42 of the setting monitoring server 6. In the comparing section 42, it is determined whether the combination matches the correspondence stored in the setting storing section 44. This is carried out in the manner described above in detail.

It should be noted that the present invention is not just limited to the foregoing configuration in which the setting monitoring section 30(B) is connected via the network 4. For example, the monitoring device may be provided between the personal computer 2 and the printer 3. Specifically, the data file and processing conditions may be sent from the personal computer 2 to the printer 3 via the monitoring device. In this case, when the comparing section 42 decides "unmatched," the notifying section 43 stops sending the data file and processing condition to the printer 3, so that the data will not be processed improperly.

Third Embodiment

Yet another embodiment of the present invention is described below. Note that, for convenience of explanation, members having the same functions as those described in the foregoing First and Second Embodiments are given the same reference numerals and explanations thereof are omitted here.

Figure 6:
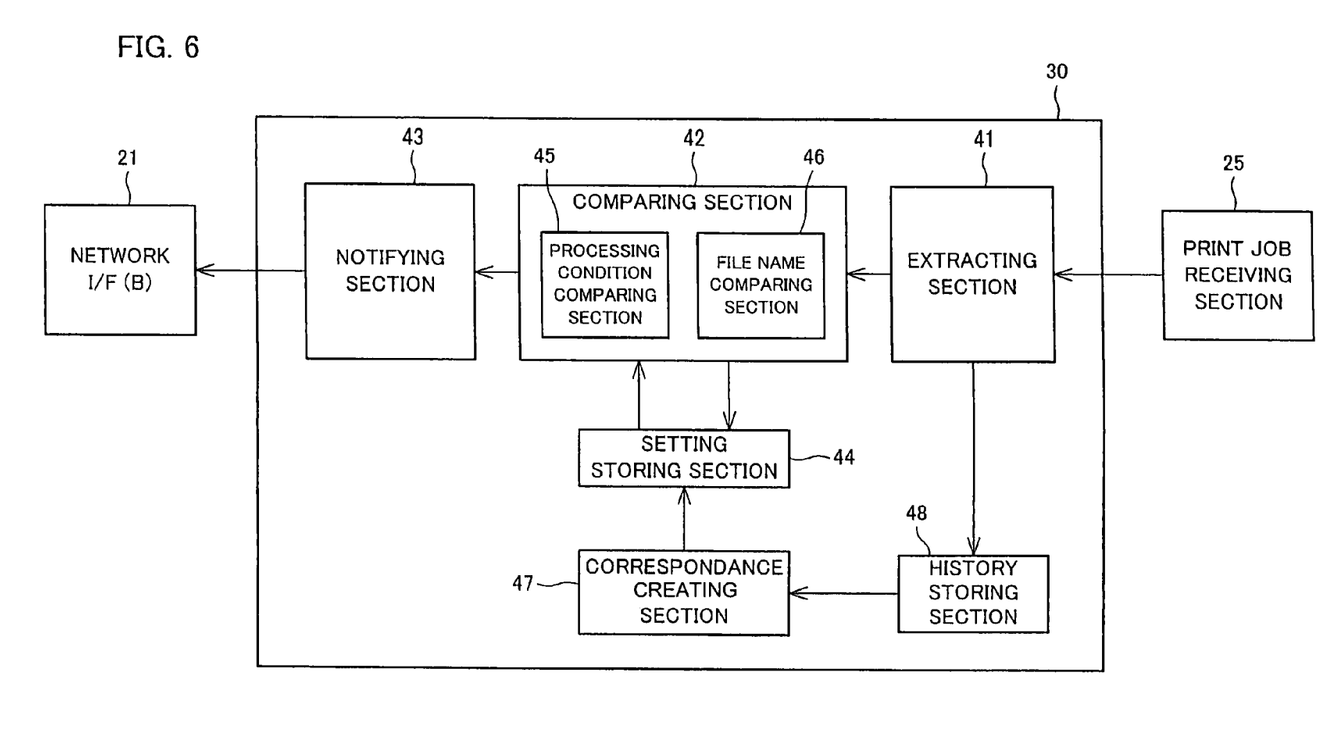
FIG. 6 is a block diagram schematically illustrating a structure of a monitoring device storing correspondence based on past history, according to one embodiment of the present invention.

A monitoring device of the present embodiment stores combinations of transmitted identification information and transmitted processing condition of a data file obtained from an external source. Based on the history of stored combinations, the monitoring device creates a correspondence to be stored in the setting storing section 44. This is described below.

According to the present embodiment, a block diagram of FIG. 6 schematically illustrates a configuration of a monitoring device 30 that stores correspondences based on past history. Note that, the description below is given through a case where the monitoring device is provided in the printer 3.

The monitoring device 30 includes a history storing section 48 and a correspondence creating section 47, in addition to the extracting section 41, the comparing section 42, the setting storing section 44, and the notifying section 43.

The history storing section 48 is provided to store combinations of transmitted identification information and transmitted processing conditions obtained by the extracting section 41.

The correspondence creating section 47 creates correspondences to be stored in the setting storing section 44, based on the combination history stored in the history storing section 48. Specifically, the correspondence creating section 47 refers to multiple combinations stored in the setting storing section 44, and finds therein data files with similar data file names. If similar data file names are present, the correspondence creating section 47 finds similar processing conditions among the processing conditions with these data file names. If similar processing conditions are present, the data files with similar data file names are related to the processing conditions between which similarity was found. The correspondence so established is stored in the setting storing section 44. The correspondence is created in this manner. Note that, the processing condition may have a certain range, for example. Specifically, in order to establish a correspondence, a single data file name may be related to a certain range of processing condition.

Figure 7:
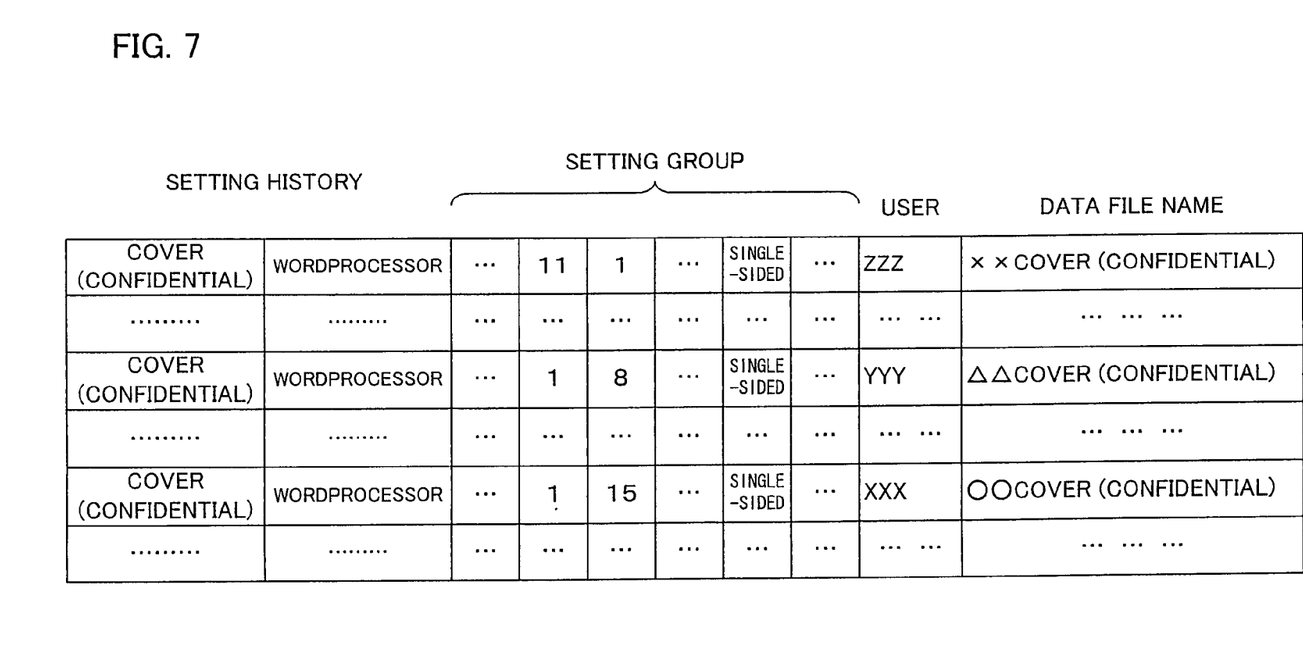
FIG. 7 is a table explaining data file names and processing conditions stored in a history storing section.

FIG. 7 is a table representing data file names and processing conditions stored in the history storing section 48. In the table shown in FIG. 7, common character strings are extracted from the file names to create identification information for the data files. In this case, in order to establish a correspondence, the correspondence creating section 47 relates identification information of the data files to the processing conditions based on the data file names represented by these character strings, not the data file names themselves.

By thus establishing a correspondence based on the data files and processing conditions sent to the printer 3, it is not required to create a correspondence beforehand.

While the invention is susceptible to various modifications and alternative forms, the invention was described by way of the embodiments given above. It should be understood, however, that it is not intended to limit the invention to the particular forms disclosed, but on the contrary, the invention is to cover all modifications, equivalents, and alternatives falling within the scope of the invention as defined in the appended claims.

As described above, the present invention provides a monitoring device for monitoring a data file, and a processing condition used to process the data file in an information processing apparatus (printer 3), upon the data file and the processing condition being transmitted to the information processing apparatus, the monitoring device including: storing means (setting storing section 44) for storing beforehand a correspondence between identification information for identifying a data file, and a processing condition for the identification information; acquiring means (extracting section 41) for acquiring, as transmitted identification information, identification information of the data file transmitted to the information processing apparatus, and, as a transmitted processing condition, the processing condition of the data file transmitted to the information processing apparatus; determining means (comparing section 42) for determining whether a combination of the transmitted identification information and the transmitted processing condition matches the correspondence between the identification information and the processing condition stored in the storing means; and notifying means (notifying section 43) for notifying a sender of the data file that there is no match, if so determined by the determining means.

With this configuration, the determining means determines whether a combination of transmitted identification information and transmitted processing condition obtained from the data file and processing condition transmitted to the information processing apparatus matches the correspondence stored in the storing means. That is, by storing the correspondence beforehand in the storing means, the determining means can determine the appropriateness of the combination of a data file and processing condition transmitted to the information processing apparatus. For example, the determining means determines the appropriateness of the processing condition of the transmitted data file to be processed by a predetermined processing method, and, if found inappropriate, sends out a notice. Note that, as used herein, to "send out a notice" means some information is sent to a sender of the data file.

In the monitoring device (setting monitoring sections 30, 52) according to the present invention, it is preferable that the determining means (comparing section 42) include: searching means (file name comparing section 46) for searching the storing means to find therein a correspondence that contains identification information similar to the transmitted identification information; and condition determining means (processing condition comparing section 45) for determining whether the transmitted processing condition matches a processing condition contained in the correspondence found by the searching means.

With this configuration, based on the transmitted identification information, a search is made through the storing means to find therein an appropriate correspondence, and whether or not the transmitted processing condition matches a processing condition contained in the correspondence is determined. More specifically, the appropriateness of the processing condition assigned to the data file to be processed by a predetermined processing condition is determined, and, if inappropriate, a notice is sent to a sender of the data file. Note that, as used herein, the term "similar" includes "a perfect match." That is, the term "similar" is used where there is a perfect match or a partial match (similar as a whole). In other words, the terms "similar" is used where there is at least a partial match. Note that, even when there is no partial match or complete match, the term "similar" can be used if there is a pre-set correspondence between the transmitted identification information and the stored identification information stored in the storing means.

In the monitoring device according to the present invention, it is preferable that the data file be created using a shared file shared by a plurality of operators, or a template used by a plurality of operators.

With this configuration, the appropriateness of a processing condition for a template or a shared file can be determined, allowing the same processing condition to be easily used among a plurality of operators.

In the monitoring device according to the present invention, it is preferable that the storing means store, in addition to the correspondence, a contact address of the data file and the processing condition, and that the notifying means notify a sender of the data file about the contact address, if the determining means did not find a match.

With this configuration, since the sender is informed of a contact address, the sender can readily make an inquiry to the contact address even when the sender does not know proper processing conditions or other necessary information.

In the monitoring device according to the present invention, it is preferable that the storing means stores, in addition to the correspondence, notes concerning the data file and the processing condition, and that the notifying means notify a sender of the data file about the notes, if the determining means did not find a match.

With this configuration, since the sender is informed of notes in addition to the contact address, the sender can suitably set processing conditions for subsequent operations.

It is preferable that the monitoring device (setting monitoring sections 30, 52) further includes: history storing means (history storing section 48) for storing a combination of the transmitted identification information and the transmitted processing conditions; and correspondence creating means (correspondence creating section 47) for creating, based on the combination stored in the history storing means (history storing section 48), a correspondence between identification information and a processing condition, and storing the correspondence in the storing means (setting storing section 44).

With this configuration, the correspondence is established from the accumulated combinations of transmitted identification information and transmitted processing conditions of the past data files transmitted to the information processing apparatus. As such, an operator does not need to create the correspondence beforehand.

In the monitoring device according to the present invention, it is preferable that notifying means causes the information processing apparatus to stop processing the data file, if the determining means did not find a match.

With this configuration, the notifying means stops the processing of the data file if the combination does not match the correspondence. In this way, there will be no unnecessary processes. Note that, the information processing apparatus may be caused to stop processing the data file, for example, by sending a stop command to the information processing apparatus, or, alternatively, by stopping a supply of the data file to the information processing apparatus when the data file is transmitted to the information processing apparatus via the monitoring device.

An image forming apparatus (printer 3) of the present invention includes the monitoring device.

With this configuration, the image forming apparatus can provide a suitable process.

A monitoring system (monitoring system 1) according to the present invention includes: the monitoring device; an information processing apparatus (printer 3) for processing received data file; and a data transmitting apparatus (personal computer 2) for transmitting a data file to the information processing apparatus.

With this configuration, the monitoring device can determine the appropriateness of the combination of a transmitted data file and transmitted processing condition. The data transmitting apparatus is used to convert a shared file into a data file, for example.

In the monitoring system according to the present invention, it is preferable that the information processing apparatus include transmitting means (setting transmitting section 24) for transmitting a combination of the transmitted identification information and the transmitted processing condition to the monitoring device (setting monitoring sections 30, 52).

With this configuration, since the information processing apparatus is provided with the transmitting means for transmitting the combination to the information processing apparatus, the information processing apparatus can transmit the combination to the monitoring device. This allows for monitoring without providing the monitoring device between the information processing apparatus and the data transmitting apparatus.

The present invention provides a monitoring method for monitoring a data file, and a processing condition used to process the data file in an information processing apparatus, upon the data file and the processing condition being transmitted to the information processing apparatus, the monitoring method including: a storing step of storing a correspondence between identification information for identifying a data file, and a processing condition for the identification information; an acquiring step of acquiring, as transmitted identification information, identification information of the data file transmitted to the information processing apparatus, and, as a transmitted processing condition, the processing condition of the data file transmitted to the information processing apparatus; a determining step of determining whether a combination of the transmitted identification information and the transmitted processing condition matches the correspondence between the identification information and the processing condition stored in the storing means; and a notifying step of notifying a sender of the data file that there is no match, if so determined in the determining step.

With this configuration, the appropriateness of the transmitted processing condition for a data file to be processed by a predetermined processing method is determined, and, if found inappropriate, a notice is sent out.

The present invention provides a monitoring program for operating the monitoring device, the monitoring program causing a computer to operate as: a storing device for storing beforehand a correspondence between identification information for identifying a data file, and a processing condition of the data file having the identification information; an acquiring section for acquiring, as transmitted identification information, identification information of a data file transmitted to an information processing apparatus, and, as a transmitted processing condition, a processing condition of the data file transmitted to the information processing apparatus;

a determining section for determining whether a combination of the transmitted identification information and the transmitted processing condition matches the correspondence between the identification information and the processing condition stored in the storing device; and a notifying section for notifying a sender of the data file that there is no match, if so determined by the determining section.

The present invention provides a computer-readable storage medium storing the monitoring program.

With this configuration, by reading a control program for the monitoring device from the storage medium, the monitoring device can be realized on a computer.

The monitoring device according to the present invention may be used, for example, to monitor the appropriateness of the process carried out in a network printer or other devices used by a plurality of operators.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A monitoring device for monitoring a data file and a processing condition used to process the data file in an information processing apparatus, upon the data file and the processing condition being transmitted to the information processing apparatus, said monitoring device comprising:
 (i) a storing device storing beforehand a correspondence between identification information for identifying a data file, and a processing condition of the data file ;
 (ii) an acquiring section acquiring a combination of, as transmitted identification information, identification information of the data file transmitted to the information processing apparatus, and, as a transmitted processing condition, the processing condition of the data file transmitted to the information processing apparatus;
 (iii) a determining section determining whether the combination of the transmitted identification information and the transmitted processing condition matches the correspondence between the identification information and the processing condition stored in the storing device; and
 (iv) a notifying section notifying a sender of the data file that there is no match, if so determined by the determining section, wherein:
 the identification information is made up of first identification information and second identification information, the first identification information being at least one of a name of a template used by a plurality of operators to create the data file and a name of a shared file which is a data file shared by a plurality of operators, and the second identification information being other types of identification information;
 the determining section determines whether first transmitted identification information, as the first identification information, matches the first identification information stored in the storing device;
 if the determining section determines so, the determining section determines whether a combination of the first transmitted identification information and the transmitted processing condition matches a correspondence between the first identification information and the processing condition information stored in the storing device;
 whilst if the determining section does not determine so, the determining section determines whether second transmitted identification information, as the second identification information, is similar to the second identification information stored in the storing device, and if the determining section determines so, the determining section determines whether a combination of the second transmitted identification information and the transmitted processing condition matches the correspondence between the second identification information and the processing condition stored in the storing device,
 (v) a history storing device storing a history of combinations of the transmitted identification information and the transmitted processing conditions, and
 (vi) a correspondence creating section (a) creating, based on the history of combinations stored in the history storing device, a correspondence between identification information and a processing condition, by determining whether there are mutually similar pieces of second transmitted identification information in the history of combinations; if so,
  determining whether there are mutually similar transmitted processing conditions in transmitted processing conditions corresponding to mutually similar pieces of the second transmitted identification information; and, if so, creating a correspondence between the similar second transmitted identification information and the similar transmitted processing condition as the correspondence between the identification information and the processing condition, and (b) storing the created correspondence in the storing device.

2. The monitoring device as set forth in claim 1,
 wherein the storing device stores, in addition to the correspondence, notes concerning the data file and the processing condition, and
 wherein the notifying section notifies a sender of the data file about the notes, if the determining section did not find a match.

3. The monitoring device as set forth in claim 1, wherein the notifying section causes the information processing apparatus to stop processing the data file, if the determining section did not find a match.

4. The monitoring device as set forth in claim 1, wherein the second identification information is a data file name.

5. The monitoring device as set forth in claim 1, wherein the second identification information is an extension of the data file.

6. An image forming apparatus comprising a monitoring device of claim 1.

7. A monitoring system comprising:
 a monitoring device of claim 1;
 an information processing apparatus for processing received data file; and
 a data transmitting apparatus for transmitting a data file to the information processing apparatus.

8. The monitoring system as set forth in claim 7, wherein the information processing apparatus includes a transmitting section for transmitting a combination of the transmitted identification information and the transmitted processing condition to the monitoring device.

9. The monitoring device as set forth in claim 1, wherein:
 the storing device stores, in addition to the correspondence, a contact address for the data file and the processing condition; and if the determining section did not find a match, the notifying section notifies the sender of the data file of the contact address.

10. A monitoring method for monitoring a data file, and a processing condition used to process the data file in an information processing apparatus, upon the data file and the processing condition being transmitted to the information processing apparatus, said monitoring method comprising:
(i) an acquiring step of acquiring a combination of, as transmitted identification information, identification information for identifying the data file transmitted to the information processing apparatus, and, as a transmitted processing condition, the processing condition of the data file transmitted to the information processing apparatus;
(ii) a determining step of determining whether the combination of the transmitted identification information and the transmitted processing condition matches the correspondence between the identification information for identifying the data file and the processing condition of the data file stored beforehand in a storing device; and
(iii) a notifying step of notifying a sender of the data file that there is no match, if so determined in the determining step, wherein :
the identification information is made up of first identification information and second identification information, the first identification information being at least one of a name of a template used by a plurality of operators to create the data file and a name of a shared file which is a data file shared by a plurality of operators, the second identification information being other types of identification information;
the determining step determines whether first transmitted identification information, as the first identification information, matches the first identification information stored in the storing device;
if the determining step determines so, the determining step determines whether a combination of the first transmitted information and the transmitted processing condition matches a correspondence between the first identification information and the processing condition stored in the storage device;
whilst if the determining step does not determine so, the determining step determines whether second transmitted identification information, as the second identification information, is similar to the second identification information stored in the storing device, and if the determining step determines so, the determining step determines whether a combination of the second transmitted identification information and the transmitted processing condition matches the correspondence between the second identification information and the processing condition stored in the storing device;
(iv) a storing step of storing, in a history storing device, a history of combinations of transmitted identification information and the transmitted processing conditions; and
(v) a correspondence creating step of (a) creating, based on the history of combinations stored in the history storing device, a correspondence between identification information and a processing condition, by determining whether there are mutually similar pieces of second transmitted identification information in the history of combinations; if so, determining whether there are mutually similar transmitted processing conditions in transmitted processing conditions corresponding to mutually similar pieces of the second transmitted identification information;
and if so, creating a correspondence between the similar second transmitted identification information and the similar transmitted processing condition as the correspondence between the identification information and the processing condition, and (b) storing the created correspondence in the storing device.

11. A computer-readable, non-transitory storage medium storing a monitoring program for operating a monitoring device for monitoring a data file, and a processing condition used to process the data file in an information processing apparatus, upon the data file and the processing condition being transmitted to the information processing apparatus, said monitoring device comprising:
(i) a storing device storing beforehand a correspondence between identification information for identifying a data file, and a processing condition of the data file ;
(ii) an acquiring section acquiring a combination of, as transmitted identification information, identification information of the data file transmitted to the information processing apparatus, and, as a transmitted processing condition, the processing condition of the data file transmitted to the information processing apparatus;
(iii) a determining section determining whether the combination of the transmitted identification information and the transmitted processing condition matches the correspondence between the identification information and the processing condition stored in the storing device; and
(iv) a notifying section notifying a sender of the data file that there is no match, if so determined by the determining section, wherein:
the identification information is made up of first identification information and second identification information, the first identification information being at least one of a name of a template used by a plurality of operators to create the data file and a name of a shared file which is a data file shared by a plurality of operators, and the second identification information being other types of identification information;
the determining section determines whether first transmitted identification information, as the first identification information, matches the first identification information stored in the storing device;
if the determining section determines so, the determining section determines whether a combination of the first transmitted identification information and the transmitted processing condition matches a correspondence between the first identification information and the processing condition information stored in the storing device;
whilst if the determining section does not determine so, the determining section determines whether second transmitted identification information, as the second identification information, is similar to the second identification information stored in the storing device, and if the determining section determines so, the determining section determines whether a combination of the second transmitted identification information and the transmitted processing condition matches the correspondence between the second identification information and the processing condition stored in the storing device,
(v) a history storing device storing a history of combinations of the transmitted identification information and the transmitted processing conditions, and (vi) a correspondence creating section (a) creating, based on the history of combinations stored in the history storing device, a correspondence between identification information and a processing condition, by determining whether there are mutually similar pieces of second transmitted identification information in the history of combinations; if so, determining whether there are mutually similar transmitted processing conditions in transmitted processing conditions corresponding to mutually similar pieces of the second transmitted identification information; and, if so, creating a correspondence between the similar second transmitted identification information and the similar transmitted processing condition as the correspondence between the identification information and the processing condition, and (b) storing the created correspondence in the storing device, wherein execution of the monitoring program causes a computer to function as said acquiring section, said determining section, said notifying section, and said correspondence creating section.

* * * * *